United States Patent [19]

Takamichi et al.

[11] Patent Number: 5,940,368
[45] Date of Patent: Aug. 17, 1999

[54] CELL RATE SUPERVISING SYSTEM TERMINATING CONGESTION FEEDBACK LOOP

[75] Inventors: Toru Takamichi; Satoshi Kamiya; Tutomu Murase, all of Tokyo, Japan

[73] Assignee: NEC Corporation, Tokyo, Japan

[21] Appl. No.: 08/813,429

[22] Filed: Mar. 10, 1997

[30] Foreign Application Priority Data

Sep. 6, 1996 [JP] Japan ..................... 8-236105

[51] Int. Cl.⁶ ........................................................ H04J 3/22
[52] U.S. Cl. ........................ 370/229; 370/236; 370/232; 370/235; 370/231; 370/252; 370/396
[58] Field of Search .................................. 370/229, 236, 370/468, 232, 235, 231, 253, 252, 233, 234, 395, 396, 398; 1/1

[56] References Cited

U.S. PATENT DOCUMENTS

| 5,442,624 | 8/1995 | Bonomi et al. | 370/231 |
| 5,497,375 | 3/1996 | Hluchyj et al. | 370/232 |
| 5,570,360 | 10/1996 | Klausmeier et al. | 370/232 |
| 5,726,977 | 3/1998 | Lee | 370/235 |
| 5,745,477 | 4/1998 | Zheng et al. | 370/236 X |
| 5,812,528 | 9/1998 | Vandervort | 370/235 |

FOREIGN PATENT DOCUMENTS

| A 10-041947 | 2/1998 | Japan . |
| A 10-190692 | 7/1998 | Japan . |

OTHER PUBLICATIONS

K. Satoshi, et al., "Rate Direct Notification in Virtual Source/Virtual Destination in ABR," 1996 Denshi Joho Tsushin Gakkai Tsushin Sosaietei Taikai B–720 (Aug. 30, 1996).

M. Tutomu, "Adaptive UPC/NPC for ABR Services in ATM Networks," 1996 Denshi Joho Tsushin Gakkai Tsushin Sosaietei Taikai B–769 (Mar. 11, 1996).

T. Takamichi, et al., "Dynamic GCRA UPC with VS/VD for binary–mode ABR," 1996 Denshi Joho Tsushin Gakkai Tsushin Sosaietei Taikai B–768.

K. Satoshi, et al., "A Study on ABR–Traffic Shaper and Virtual Source/Virtual Destination for NNI," 1996 Denshi Joho Tsushin Gakkai Tsushin Sosaietei Taikai B–772.

The ATM Forum Technical Committee, "Traffic Management Specification, Version 4.0", Mar. 1996, pp. 43–48, 68–71, 92–97.

T. Takamichi et al., "Dynamic–GCRA UPC with VS/VD for binary–mode ABR", *Proceedings of the 1996 IEICE General Conference*, Mar. 28–31, 1996, p. 200.

*Primary Examiner*—Brian Zimmerman
*Assistant Examiner*—William H. Wilson, Jr.
*Attorney, Agent, or Firm*—Sughrue, Mion, Zinn, Macpeak & Seas, PLLC

[57] ABSTRACT

In a cell rate supervising system for supervising a rate of cells flowing in a certain direction, a binary mode congestion feedback loop terminating unit terminates a first congestion feedback loop on a downstream side of that direction. The first congestion feedback loop receives a first congestion management cell from the downstream side and turns it in a binary mode to the downstream side. Also, an explicit rate (ER) mode congestion feedback loop terminating unit is provided on an upstream side of the binary mode congestion feedback loop terminating unit, and terminates a second congestion loop on an upstream side of the direction. The second congestion feedback loop receives a second congestion management cell from the upstream side and turns it in an ER mode to the upstream side. Further, a dynamic generic cell rate algorithm unit is provided on an upstream side of the ER mode congestion feedback loop terminating unit, and monitors the rate of cells in accordance with the second congestion management cell.

10 Claims, 10 Drawing Sheets

CELL RATE SUPERVISING SYSTEM TERMINATING CONGESTION FEEDBACK LOOP

BACKGROUND OF THE INVENTION

1. Field of the Invention

The present invention relates to a communication system such as an asynchronous transfer mode (ATM) system, and more particularly, to a cell rate supervising system used in the communication sytem.

2. Description of the Related Art

Recently, ATM communication systems have been developed to realize a broadband integrated services digital network (B-ISDN).

In the ATM communication system, all multi-media information related to audio, video and data are stored in fixed length cells each formed by a header (5 bytes) and a payload (48 bytes). Since the cells have the same configuration, it is possible to multiplex, demultiplex and switch in the same network at different rates regardless of the kind of multimedia.

In the ATM communication system, if an abnormally large number of cells are supplied to a network, it is impossible to guarantee quality of service (QOS). This state is called a congested state. For example, assume that a connection is carried out between a first source terminal and a destination terminal via the network and a connection is carried out between a second source terminal and the destination terminal via the network. In this case, when a cell rate from the first source terminal to the destination terminal plus a cell rate from the second source terminal to the destination terminal exceeds a peak cell rate (PCR) from the network to the destination terminal, a congested state may occur in the network.

In order to suppress the generation of congested states, various ATM service classes, i.e., a constant bit rate (CBR) service, a variable bit rate (VBR) service, an unspecified bit rate (UBR) service and an available bit rate (ABR) service are defined in the ATM communication system.

In the CBR service, a fixed cell rate is allocated to each connection between a terminal and the network. Therefore, even if there are a plurality connections carried out for one destination terminal via the network, a total of such fixed cell rates of the connections are caused to be lower than a PCR from the network to the destination terminal, and therefore, a congested state may not be generated.

In the VBR service, a statistically-determined variable cell rate is allocated to each connection between a terminal and the network. Even in this case, even if there are a plurality connections carried out for one destination terminal via the network, a total of such variable cell rates of the connections are caused to be lower than a PCR from the network to the destination terminal, and therefore, a congested state may not be generated.

In the UBR service, a cell rate is determined by a terminal, that is, the control of cell rates by the network is not carried out. Therefore, a congested state may be generated.

In the ABR service, an allowed cell rate (ACR) is calculated in accordance with congestion information fed back from the network, and also, the ACR is changed between a minimum cell rate (MCR) and a PCR. That is, $$MCR \leq ACR \leq PCR$$

Thus, a feedback operation using the congestion information is performed upon the ACR, which effectively makes use of the network.

The present invention is related to the ABR service.

Even in the ABR service, a congested state may be generated. That is, if a terminal has a trouble, the terminal may generate cells beyond the ACR. Or, if the MCR of the terminal is erroneously changed, the terminal may generate cells beyond the optimum ACR. Therefore, in order to monitor whether or not the cell rate of cells generated from each terminal is lower than the corresponding ACR, a cell rate supervising unit having a policing function is provided. In the ABR service, a dynamic generic cell rate algorithm (DGCRA) is used.

Note that a generic cell rate algorithm (GCRA), a virtual scheduling algorithm (VSA) or a continous-state leaky bucket algorithm (CSLBA) are used for the CBR service and the VBR service. For example, a usage parameter control (UPC) unit using these algorithms monitors excess traffic in a user-network interface (UNI), and a network parameter control (NPC) unit using these algorithms monitors excess traffic between networks in a network-node interface (NNI).

Returning to the DGCRA in the ABR service, an ACR is calculated in the cell rate supervising unit in the same way as in the terminal. Therefore, if a congestion information cell is erroneously scrapped to interrupt the feedback operation, the ACR calculated in the terminal does not coincide with the ACR calculated in the cell rate supervising unit. Therefore, the policing operation cannot be carried out normally. As a result, accessible cells may be scrapped or transmitted with special tags, or unaccessible cells may be transmitted through the cell rate supervising unit. The former makes a user terminal disadvantageous. The latter not only makes the user terminal disadvantageous, but also reduces the link utilization of the network. Although this abnormal state may soon disappear in an explicit rate (ER) mode, this abnormal state may not disappear for long time in a binary mode. This will be explained later in detail.

SUMMARY OF THE INVENTION

It is an object of the present invention to rapidly change an abnormal state caused by a difference in ACR between a user terminal and a cell rate supervising unit to a normal state in an ATM communication system.

According to the present invention, in a cell rate supervising system for supervising a rate of cells flowing in a certain direction, a binary mode congestion feedback loop terminating unit terminates a first congestion feedback loop on a downstream side of that direction. The first congestion feedback loop receives a first congestion management cell from the downstream side and turns the first congestion management cell in a binary mode to the downstream side. Also, an ER mode congestion feedback loop terminating unit is provided on an upstream side of the binary mode congestion feedback loop terminating unit, and terminates a second congestion loop on an upstream side of the direction. The second congestion feedback loop receives a second congestion management cell from the upstream side and turns the second congestion management cell in an ER mode to the upstream side. Further, a DGCRA unit is provided on an upstream side of the ER mode congestion feedback loop terminating unit, and monitors the rate of cells in accordance with the second congestion management cell.

Thus, the congestion feedback loops are shorter than those of the prior art. Therefore, congestion feedback information can be rapidly formed.

BRIEF DESCRIPTION OF THE DRAWINGS

The present invention will be more clearly understood form the description as set forth below, with reference to the accompanying drawings, wherein.

DESCRIPTION OF THE PREFERRED EMBODIMENTS

Before the description of the preferred embodiments, prior art ATM communication systems will be explained with reference to FIGS. 1, 2, 3, 4 and 5 (see: The ATM Forum Technical Committee, "Traffic Management Specification, Version 4.0", pp. 43–48, 68–71, 92–97, March 1996).

Figure 1:
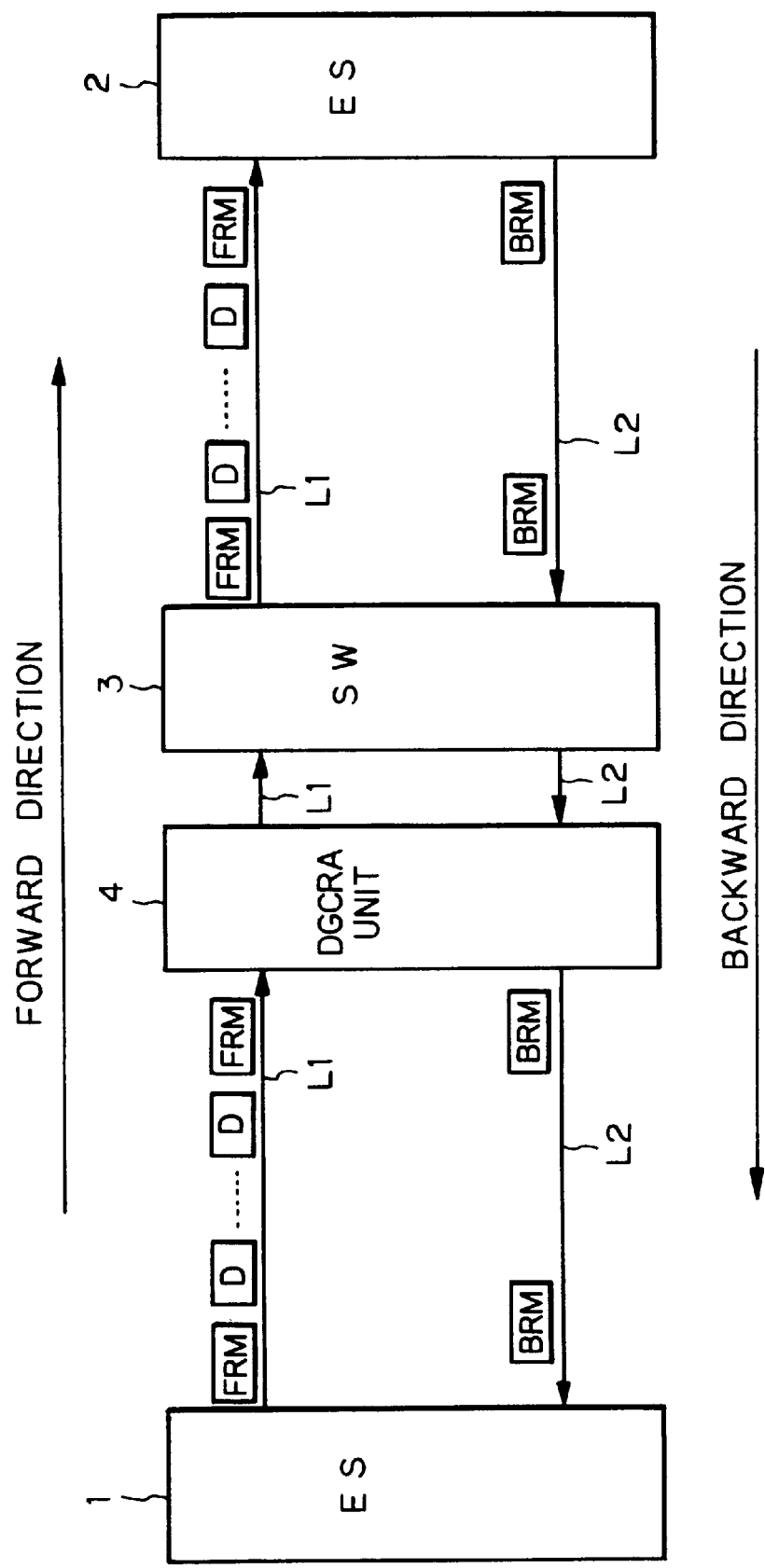
FIG. 1 is a block circuit diagram illustrating a prior art ATM communication sytem.

In FIG. 1, which illustrates a prior art ATM communication system, reference numerals 1 and 2 designate user terminals or end-systems (ES), and 3 designates an ATM switching unit (or cross-connect unit). Also, a DGCRA unit 4 is provided between the user terminal 1 and the ATM switching unit 3. When cells are transmitted from the user terminal 1 to the user terminal 2, a line L1 is a forward direction line and a line L2 is a backward direction line.

Note that FIG. 1 shows a one-directional transmission, however, a bi-directional transmission is also possible. Also, when cells are transmitted from the user terminal 2 to the user terminal 1, the line L2 is a forward direction line and the line L1 is a backward direction line. Also, another DGCRA unit as a cell rate supervising unit is provided between the user terminal 2 and the ATM switching unit 3; however, this DGCRA unit is omitted from FIG. 1 to simplify the description.

When the user terminal 1 as a source transmits data cells D via the line L1 to the user terminal 2, the cell rate of the data cells D is not larger than an ACR. Also, a resource management (RM) cell, i.e., a forward-direction RM (FRM) is transmitted per a definite number of data cells D such as 32 data cells D.

On the other hand, the user terminal 2 as a destination extracts the FRM cells and feeds back these cells as backward-direction RM (BRM) cells to the line L2. In this case, the user terminal 2 can write congestion information into the BRM cells. Further, the ATM switching unit 3 writes congestion information into the FRM cells or the BRM cells.

When the user terminal 1 as a source receives the BRM cells, the user terminal 1 changes the ACR or calculates an ACR in accordance with the congestion information stored in each of the BRM cells.

Figure 2:
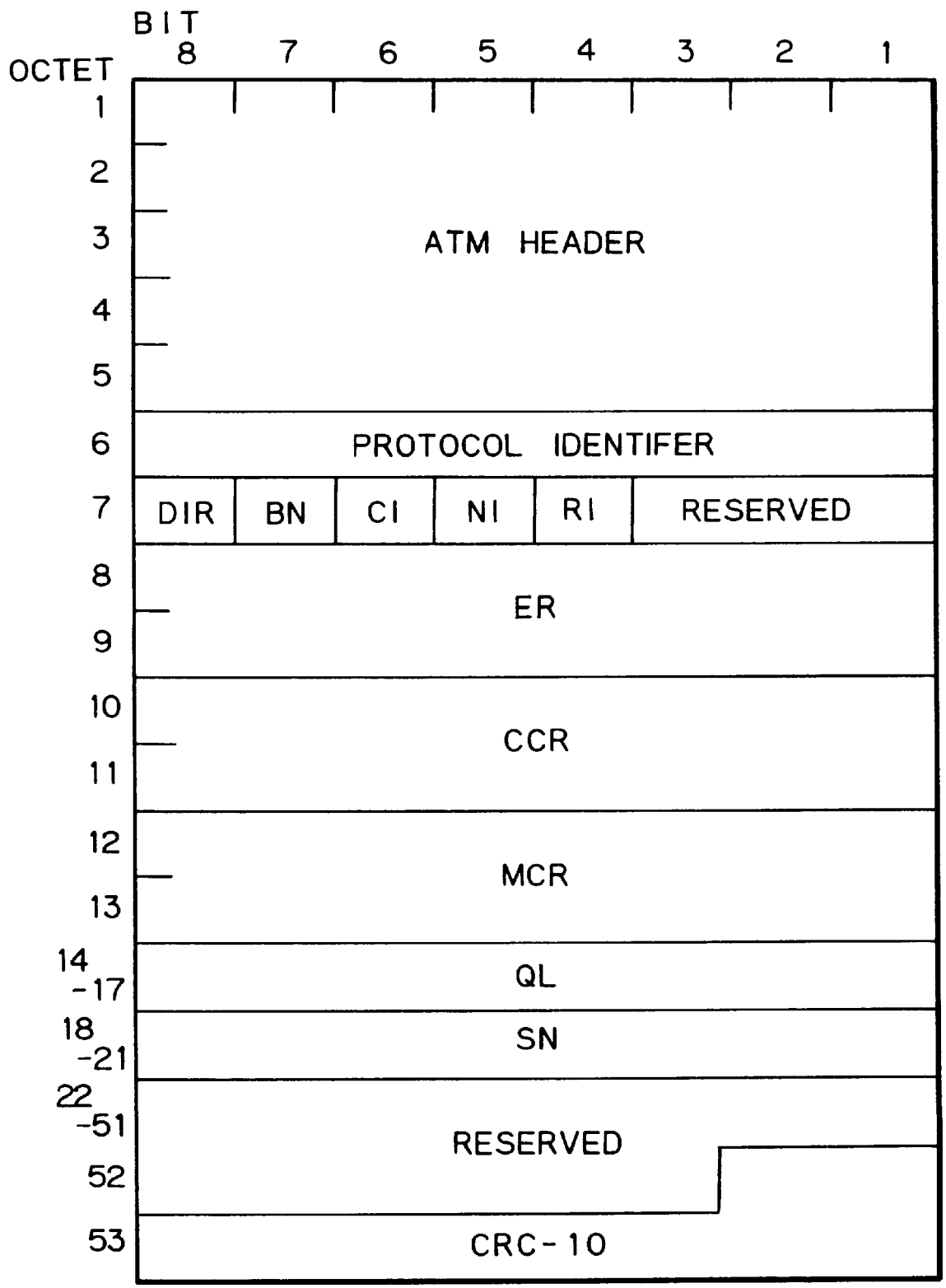
FIG. 2 is a format of the RM cells of FIG. 1.

In FIG. 2, which illustrates a format of one of the RM cells of FIG. 1, this format is common for the FRM cells and the BRM cells (see p.43 of the above-mentioned document).

Particularly, a direction (DIR) bit indicates an FRM cell (="1") or a BRM cell (="1"). The DIR bit is changed when turned around by at a destination which is the user terminal 2, for example. Also, a congestion indication (CI) bit, a no increase (NI) bit and an explicit cell rate (ER) field are provided for feedback congestion information.

The CI bit indicates that there is congestion in the ATM switching unit 3 or the user terminal 2 serving as a destination. That is, if there is congestion, the ATM switching unit 3 or the user terminal 2 serving as a destination sets "1"in the CI bit. Otherwise, "0" is set in the CI bit.

The NI bit is used to prevent a source from increasing its ACR. That is, if there is congestion, the ATM switching unit 3 or the user terminal 2 serving as a destination sets "1" in the NI bit. Otherwise, "0" is set in the NI bit.

The ER field is used to limit the ACR of the user terminal 1 serving as a source to a special value. The ER field is initially set to a PCR.

An ACR is calculated in accordance with the feedback congestion information CI, NI and ER in the user terminal 1 serving as a source.

Figure 3:
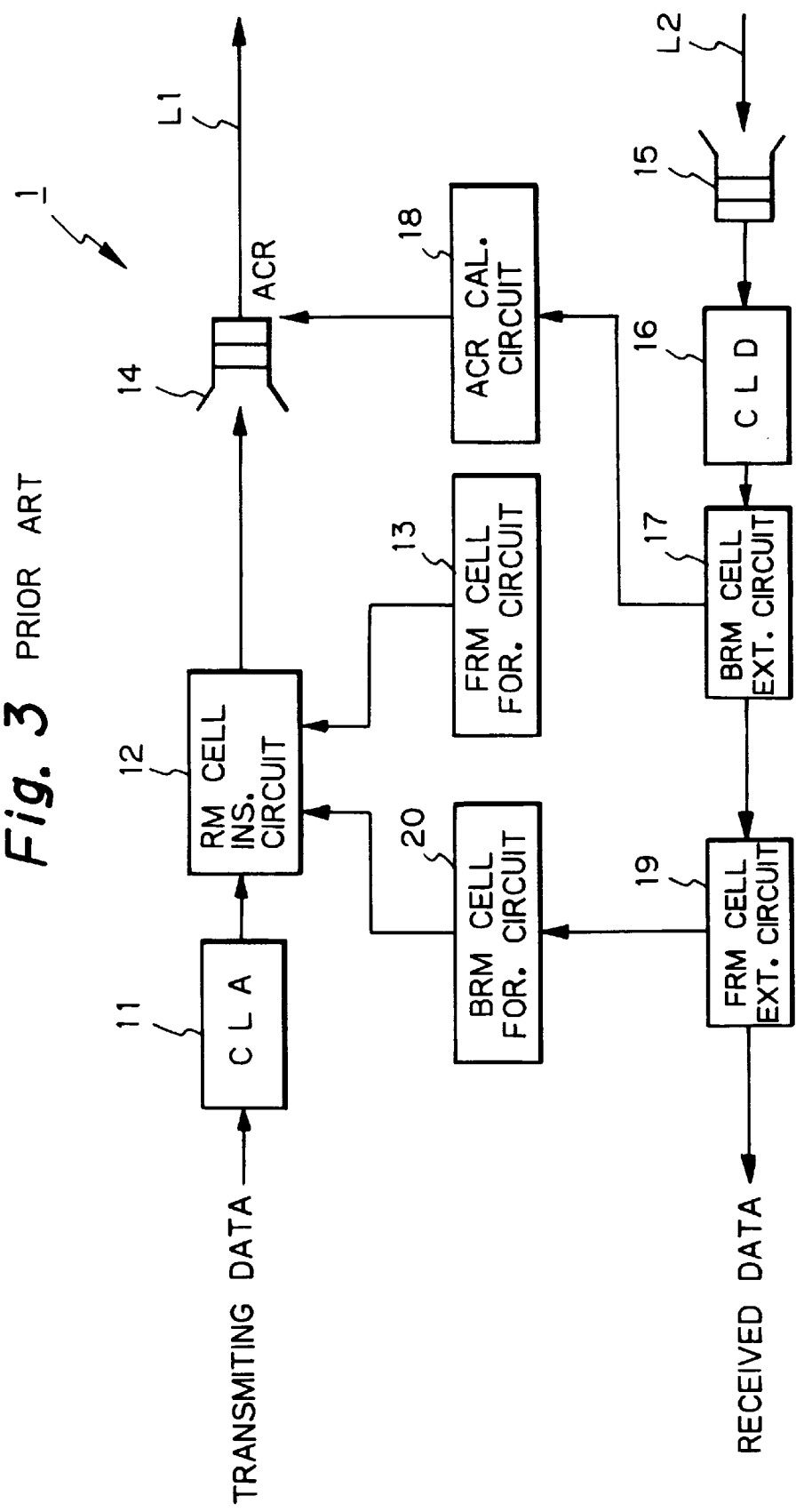
FIG. 3 is a detailed block cricuit diagram of the user terminal of FIG. 1.

In FIG. 3, which is a detailed block circuit diagram of the user terminal 1, reference numeral 11 designates a cell assemblying circuit for receiving transmitting data to assemble data cells D. The data cells D are supplied to an RM cell insertion circuit 12, so that the data cells D are merged with ERM cells. The FRM cells are formed by an FRM cell forming circuit 13. In this case, CI, NI and ER are definite values. The data cells D associated with the FRM cells are stored in a cell buffer 14. The cells stored in the cell buffer 14 are then transimitted to the line L1 at a rate not larger than the ACR.

On the other hand, a cell buffer 15 receives BRM cells from the line L2 and stores them. The BRM cells are deassembled at a cell disassembling circuit 16. Then, the BRM cells are extracted by a BRM extraction circuit 17.

An ACR calculating circuit 18 is provided between the BRM extraction circuit 17 and the cell buffer 14. That is, the ACR calculating circuit 18 calculates an ACR in accordance with feedback congestion information CI, NI and ER extracted by the BRM cell extraction circuit 17, and supplies the calculated ACR to the cell buffer 14. This will be explained later in detail with reference to FIG. 4.

In FIG. 3, note that an FRM cell extraction circuit 19 and an FRM cell forming circuit 20 are operated when the user terminal 1 serves as a destination. In this case, the FRM forming circuit 20 extracts FRM cells, and writes predetermined bits into the FRM cells to pass the received data cells as well as the written FRM cells. Simultaneously, the FRM cell extraction circuit 19 writes "1" into the DIR bit of the extracted FRM cells and supplies them to the BRM cell forming circuit 20.

The operation of the ACR calculating circuit 18 of FIG. 3 is explained below with reference to FIG. 4 (see Source Behavior of pp. 45 and 46 of the above-mentioned document).

First, at step 401, it is determined whether or not the CI bit is "1", and also, at step 402, it is determined whether or not the NI bit is "0". As a result, if CI="1", the control proceeds to step 403 to 405. Also, if CI=NI="0", the control proceeds to steps 406 to 408. Further, if CI="0" and NI="1", the control proceeds directly to steps 409 and 410.

At step 403, the current ACR is decreased by $$ACR \leftarrow ACR - ACR \cdot RDF$$

where RDF is a constant. Then, at steps 404 and 405, the ACR is guarded by a minimum value, i.e., MCR.

At step 406, the current ACR is increased by $$ACR \leftarrow ACR + ACR \cdot RDF$$

Then, at steps 407 and 408, the ACR is guarded by a maximum value, i.e., PCR.

At step 409, it is determined whether or not ACR is larger than ER. Only if ACR>ER, does the control proceed to step 410 which causes ACR to be ER. That is, a minimum value of ACR and ER is selected as a new ACR.

At steps 411 and 412, the current ACR is again guarded by a minimum value, i.e., MCR. Thus, the ER value is prevented from being smaller than MCR.

Finally, at step 413, the ACR is outputted to the cell buffer 14 of FIG. 3.

Figure 4:
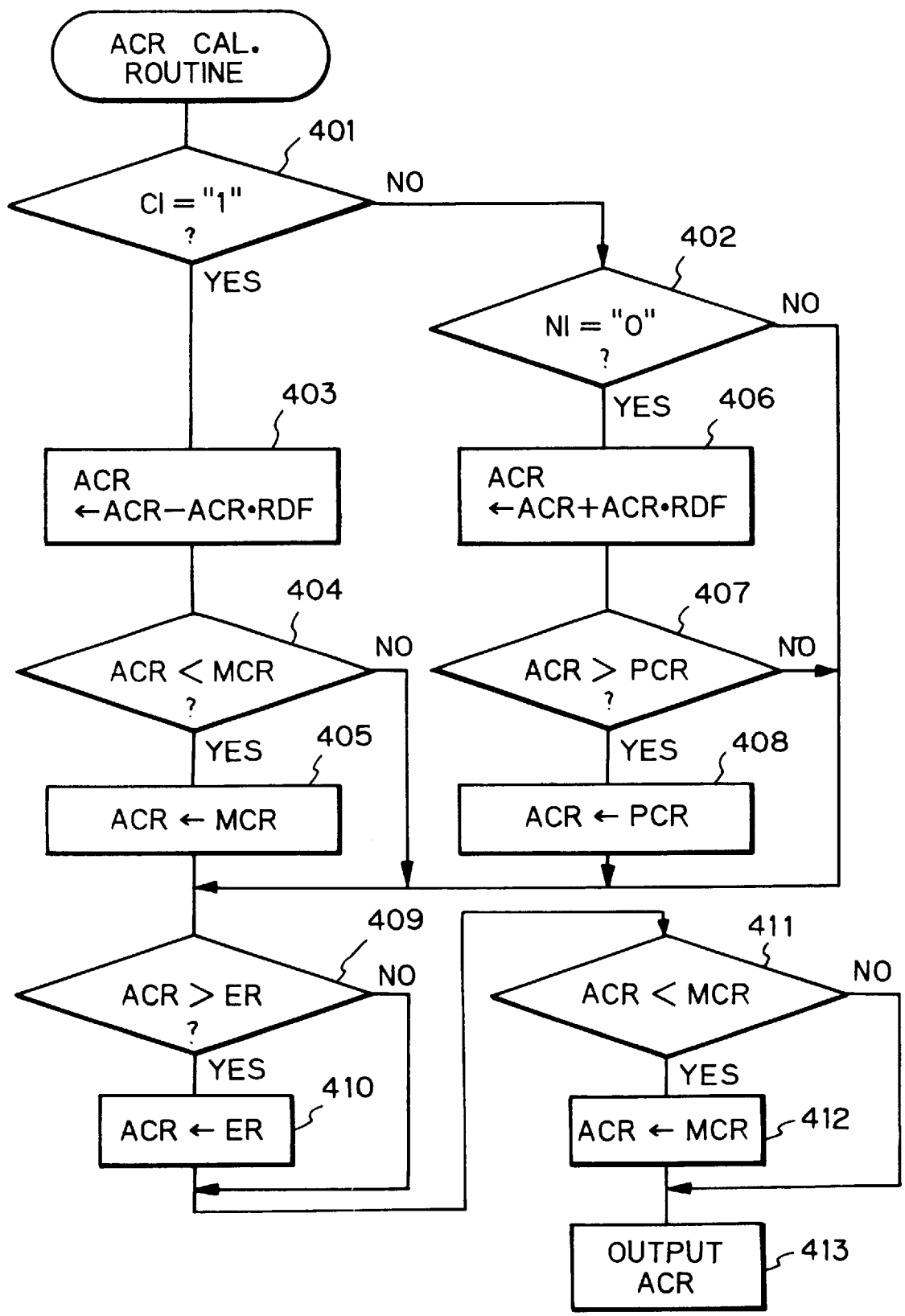
FIG. 4 is a flowchart showing the operation of the ACR calculating circuit of FIG. 3.

Note that the flowchart as shown in FIG. 4 can be constructed by hardware.

The ACR service is divided into a binary mode and an ER mode. In the binary mode, the ACR is subject to the CI bit and the NI bit. For example, if PCR is set in ER, the ACR is changed at steps 403 to 408 in accordance with the CI bit and the NI bit, and also, the ACR is unchanged by steps 409 and 410. On the other hand, in the ER mode, the ACR is subjected to the ER field. In this case, CI="0" and NI="1". Note that the flowchart of FIG. 4 can respond to both the binary mode and the ER mode.

Figure 5:
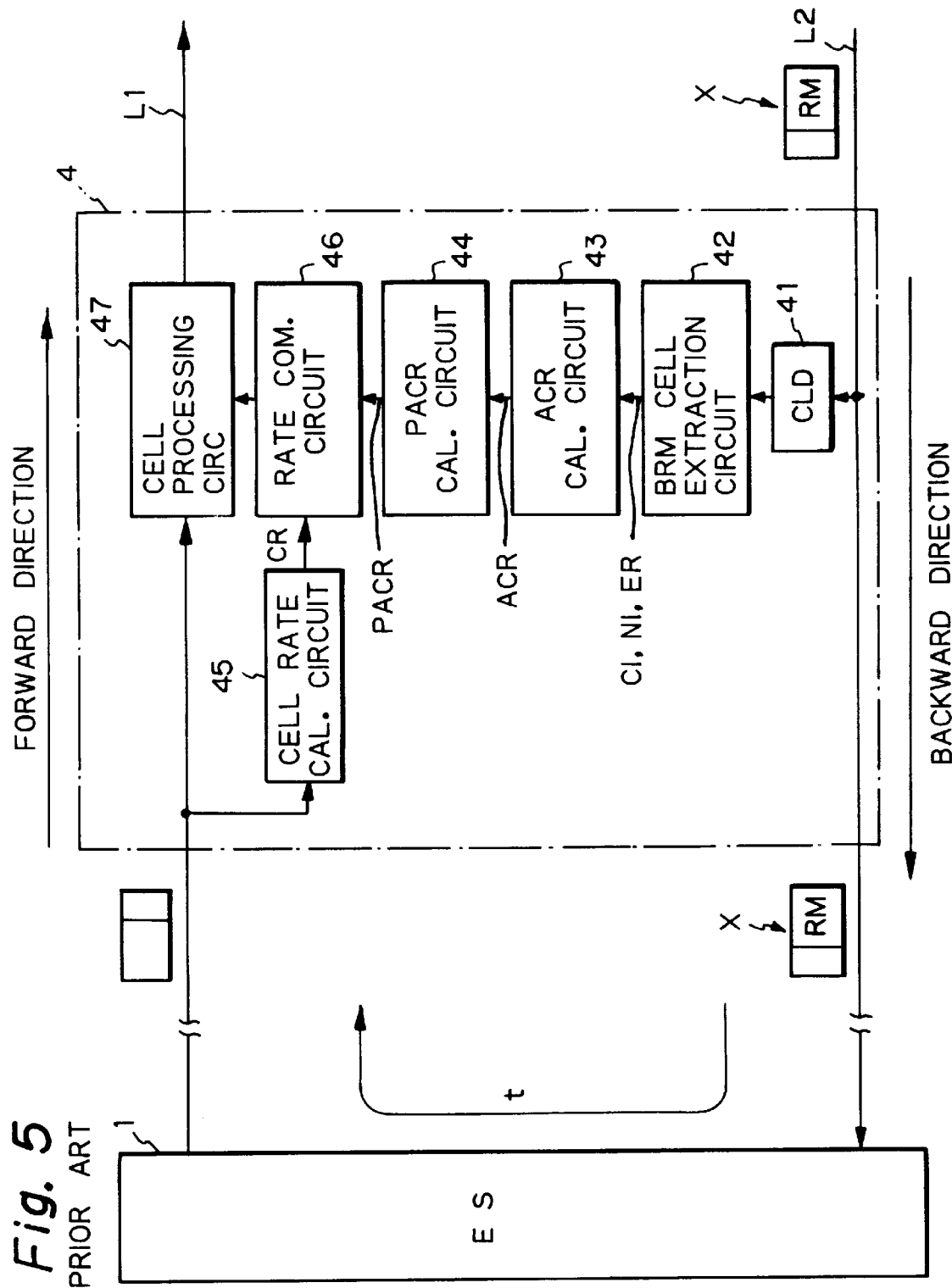
FIG. 5 is a detailed block circuit diagram of the DGCRA unit of FIG. 1.

In FIG. 5, which is a detailed block circuit diagram of the DGCRA unit 4 of FIG. 1, a cell disassembling circuit 41, a BRM cell extration circuit 42 and an ACR calculating circuit 43 having the same configurations as the cell disassembling circuit 16, the BRM cell extraction circuit 17 and the ACR calculating circuit 18, respectively, of FIG. 3, are provided. Also, a PACR calculating circuit 44 calculates a policing ACR (PACR) in accordance with the ACR calculated in the ACR calculating circuit 43. The PACR is obtained by delaying the ACR by a transmission delay time t of a BRM cell X outgoing from the DGCRA unit 4 to the user terminal 1. Such a delay time t depends on the distance between the DGCRA unit 4 and the user terminal 1, the configuration of the user terminal 1, hardware such as a private branch exchange (PBX) between the DGCRA unit 4 and the user terminal 1, and the like. The algorithm of the PACR calculating circuit 44 is discussed on page 92 to 96 of the above-mentioned document.

On the other hand, a cell rate calculating circuit 45 calculates a cell rate CR of cells propagating in the forward direction of the line L1. The cell rate CR is supplied to a rate comparing circuit 46, so that the cell rate CR is compared with PACR. As a result, if CR≦PACR, a cell processing circuit 47 passes cells therethrough. On the contrary, if CR>PACR, the processing circuit 47 scraps cells or passes the cells with special tags.

Here, the ACR calculated by the user terminal 1 is denoted by ACRU and the ACR calculated by the DGCRA unit 4 is denoted by ACRD.

If the RM cell X normally arrives at the user terminal 1, then $$ACRD = ACRU.$$

However, if the RM cell X is scrapped in the line L2 between the DGCRA unit 4 and the user terminal 1, the PBX or the like, the ACRU of the ACR calculating circuit 18 does not coincide with the ACRD of the ACR calculating circuit 43, i.e., $$ACDR \neq ACRU$$

This state continues for a long time in the binary mode.

For example, if the RM cell X includes CI="1", the ACRD is decreased, while the ACRU is not changed. Therefore, $$ACRD < ACRU$$

In this case, accessible cells may be scrapped or transmitted with special tags, so that the user terminal 1 is more disadvantageous than the ATM switching unit 3. Note that this state continues until both ACRD and ACR reach MCR.

On the other hand, if the RM cell X includes CI ="0" and NI="0", the ACRD is increased, while the ACRU is not changed. Therefore, $$ACRD > ACRU$$

In this case, in spite of having a right to use a bandwidth to the ACRD, the user terminal 1 cannot increase its cell rate up to ACRU. As a result, the user terminal 1 is disadvantageous, and the link utilization of the network is reduced. Note that this state continues until both ACRD and ACRU reach PCR.

Figure 6:
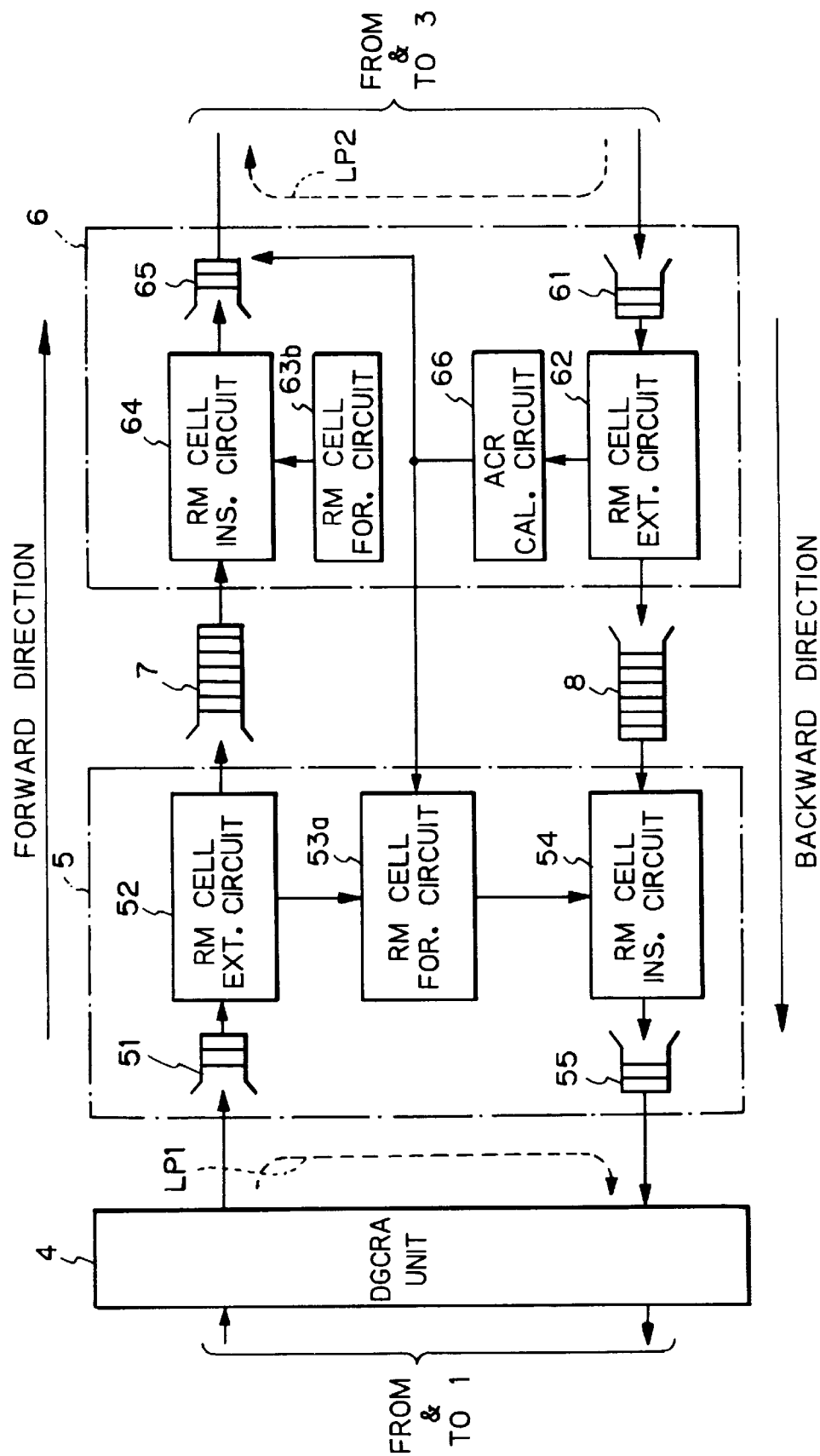
FIG. 6 is a block circuit diagram illustrating a first embodiment of the ATM communication system according to the present invention.

In FIG. 6, which illustrates a first embodiment of the present invention, two virtual terminals 5 and 6 are provided between the DGCRA unit 4 and the ATM switching unit 3 of FIG. 1, and cell buffers 7 and 8 are provided between the virtual terminals 5 and 6. The virtual terminals 5 and 6 and the cell buffers 7 and 8 have the same configuration; however, since it is assumed that data cells stream from the user terminal 1 to the ATM switching unit 3, only the related components are illustrated for simplifying the description.

The virtual terminal 5 terminates a congestion feedback loop for the DGCRA unit 4 and the user terminal 1, as indicated by LP1. In other words, RM cells from the DGCRA unit 4 are turned around by the virtual terminal 5 using the ER mode, although data cells pass therethrough.

The virtual terminal 6 terminates a congestion feedback loop for the ATM switching unit 3, as indicated by LP2. In other words, RM cells from the ATM switching unit 3 are turned around by the virtual terminal 6 using the binary mode, although data cells pass therethrough.

The virtual terminal 5 includes a cell buffer 51 for storing cells in the forward direction data stream, an RM cell extraction circuit 52 for extracting FRM cells from the cells transited from the cell buffer 51 to the cell buffer 7, an RM cell forming circuit 53a for forming BRM cells by receiving ACRs from the virtual terminal 5 and writing them into the extracted FRM cells, and an RM cell insertion circuit 54 for inserting the BRM cells in the backward direction data stream from the cell buffer 8 to a cell buffer 55.

The virtual terminal 6 includes a cell buffer 61 for storing cells in the backward direction data stream, an RM cell extraction circuit 62 for extracting BRM cells from the cells from the cell buffer 61 to the cell buffer 8, an RM cell forming circuit 63b for forming FRM cells, and an RM cell insertion circuit 64 for inserting the FRM cells in the forward direction data stream from the cell buffer 7 to a cell buffer 65. Also, an ACR calculating circuit 66 is provided between the RM cell extraction circuit 62 and the cell buffer 65, and is further connected to the RM cell forming circuit 53a of the virtual terminal 5. That is, the ACR calculating circuit 62 calculates an ACR in accordance with the CI bit, the NI bit and the ER field of the extracted cell by the RM cell extraction circuit 62, thus policing the cells in the forward direction data stream at the cell buffer 65.

The operation of the virtual terminal 6 is explained next.

First, the cell buffer 61 receives cells flowing in the backward direction to transmit the cells to the RM cell extraction circuit 62. As a result, the RM cell extraction circuit 62 extracts RM cells from the received cells, and writes empty data thereinto. Then, the received cells as well as the empty RM cells are transmitted to the cell buffer 8.

Simultaneously, the RM cell extraction circuit 62 transmits only BRM cells of the extracted RM cells to the ACR calculating circuit 66. As a result, the ACR calculating circuit 66 calculates an ACR in accordance with the CI bit, the NI bit and the ER field of each BRM cell. The ACR is supplied to the cell buffer 65 to carry out a policing operation, and is supplied to the virtual terminal 5. Note that the ACR calculated by the ACR calculating circuit 66 is a binary mode.

On the other hand, the RM cell insertion circuit 64 inserts FRM cells or BRM cells into cells flowing from the cell buffer 7 to the cell buffer 65. In this case, the FRM cells are formed in the RM cell forming circuit 63b, and the BRM cells are formed in an RM cell forming circuit (not shown) corresponding to the RM cell forming circuit 53a.

The operation of the virtual terminal 5 is explained next.

First, the cell buffer 51 receives cells flowing in the forward direction to transmit the cells to the RM cell extraction circuit 52. As a result, the RM cell extraction circuit 52 extracts RM cells from the received cells, and writes empty data thereinto. Then, the received cells as well as the empty RM cells are transmitted to the cell buffer 7.

Simultaneously, the RM cell extraction circuit 52 transmits only ERM cells of the extracted RM cells to the RM cell forming circuit 53a. As a result, the RM cell forming circuit 53a changes the DIR bit of each of the ERM cells, so that the FRM cells are changed into BRM cells. In addition, the RM cell forming circuit 53a writes the ACR of the ACR calculating circuit 66 into the ER field of each of the BRM cells. Note that the ACR written into each of the BRM cells is an ER mode.

On the other hand, the RM cell insertion circuit 54 inserts FRM cells or BRM cells into cells flowing from the cell buffer 8 to the cell buffer 55. In this case, the BRM cells are formed in the RM cell forming circuit 53a, and the FRM cells are formed in a RM cell forming circuit (not shown) corresponding to the RM cell forming circuit 63b.

Thus, congestion information regarding the ATM switching unit 3 is written by the virtual terminal 5 into the RM cells turned around by the virtual terminal 5. In this case, however, the DGCRA unit 4 and the user terminal 1 receive the congestion information as if the congestion information were formed in the ATM switching unit 3.

As a result, the DGCRA unit 4 performs a policing operation using the congestion information turned around by the virtual terminal 5 upon the cells flowing in the forward direction.

Thus, since the next congestion information is formed in the virtual terminal 5, not in the ATM switching unit 3, even if RM cells are erroneously scrapped between the DGCRA unit 4 and the user terminal 1, the ACR calculated in the DGCRA unit 4 is immediately brought close to the ACR calculated in the user terminal 1. Thus, an abnormal state can immediately be made to disappear.

Also, since the virtual terminal 5 writes ACRs in an ER mode into BRM cells, it is unnecessary in the DGCRA unit 4 to provide means for converting congestion information in a binary mode into congestion information in an ER mode.

Figure 7:
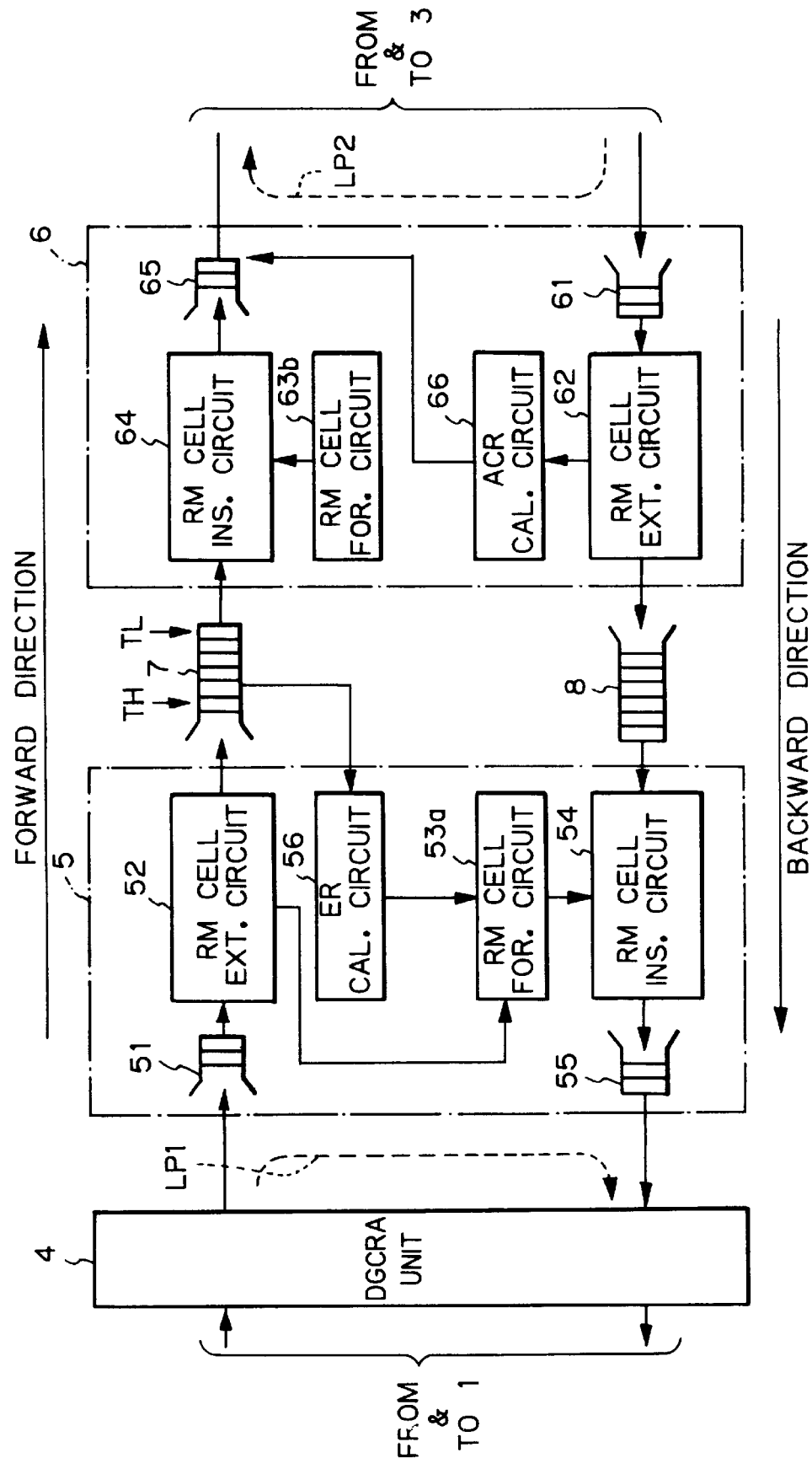
FIG. 7 is a block circuit diagram illustrating a second embodiment of the ATM communication system according to the present invention.

In FIG. 7, which illustrates a second embodiment of the present invention, an ER calculating circuit 56 is provided between the cell buffer 7 and the RM cell forming circuit 53a of FIG. 6. Instead of this, the ACR calculating circuit 66 is not connected to the RM cell forming circuit 53a. That is, the ER calculating circuit 56 calculates an ER in accordance with a cell queue QL in the cell buffer 7 as shown in FIG. 8.

Figure 8:
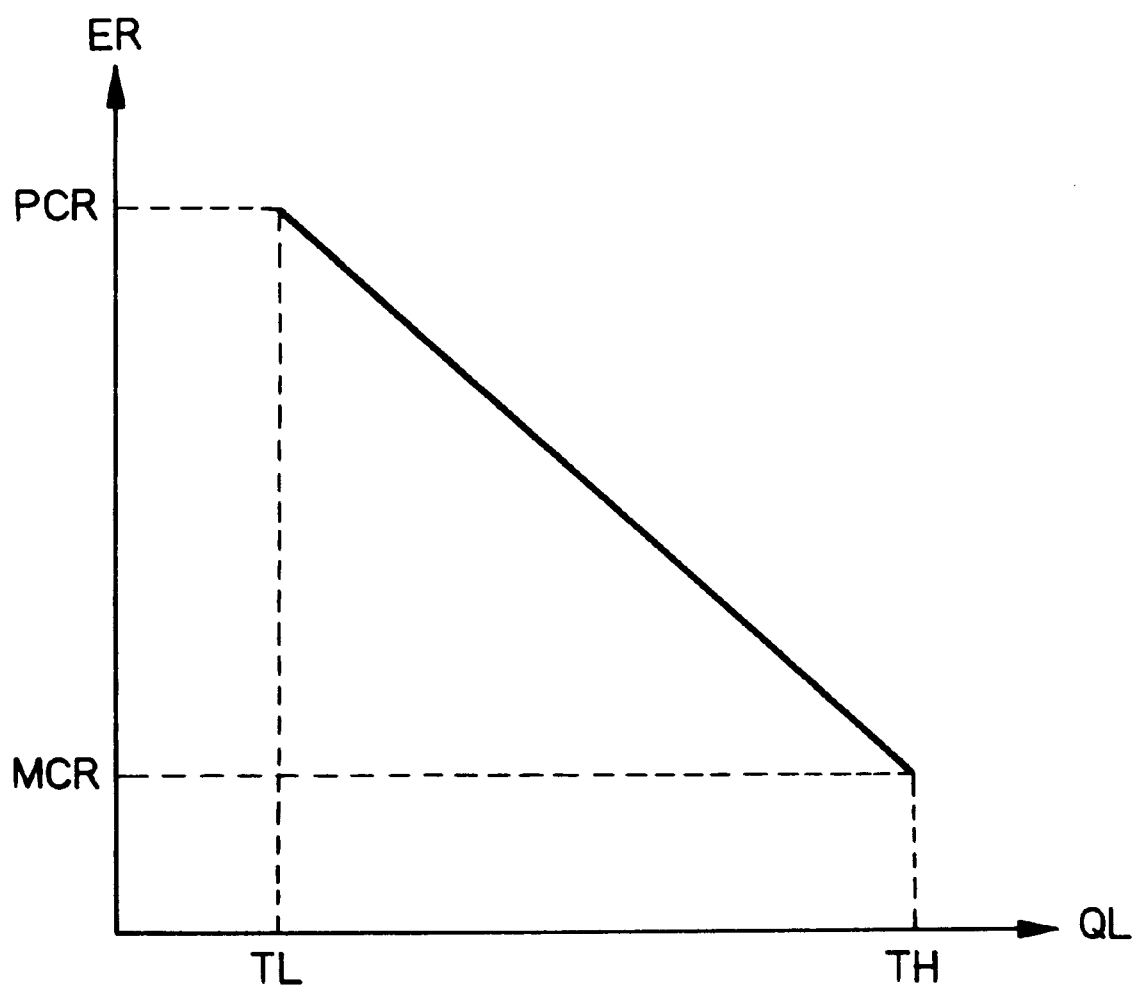
FIG. 8 is a graph showing the ER value of the ER calculating circuit of FIG. 7.

As shown in FIG. 8, if $QL \geq TH$ where TH is a maximum value of the cell queue QL, then, $ER=MCR.$ Also, if $QL \leq TL$ where TL is a minimum value of the cell queue QL, then, $ER=PCR.$ Further, if $TL<QL<TH$, then, $ER=PCR$ $-(PCR-MCR)(QL-TL)/(TH-TL)$ As a result, the RM cell forming circuit 53a changes the DIR bit of each of the FRM cells, so that the FRM cells are changed into BRM cells. In addition, the RM cell forming circuit 53a writes the ER of the ER calculating circuit 56 into the ER field of each of the BRM cells.

The cell queue QL of the cell buffer 7 is changed in accordance with the cell rate of the virtual terminal 6 in the backward direction. Therefore, the cell queue QL is changed in accordance with the congestion state of the ATM switching unit 3.

Thus, even in the second embodiment, congestion information regarding the ATM switching unit 3 is written by the virtual terminal 5 into the RM cells turned around by the virtual terminal 5. In this case, however, the DGCRA unit 4 and the user terminal 1 receive the congestion information as if the congestion information were formed in the ATM switching unit 3.

As a result, the DGCRA unit 4 performs a policing operation using the congestion information turned around by the virtual terminal 5 upon the cells flowing in the forward direction.

Thus, since the next congestion information is formed in the virtual terminal 5, not in the ATM switching unit 3, even if RM cells are erroneously scrapped between the DGCRA unit 4 and the user terminal 1, the ACR calculated in the DGCRA unit 4 is immediately brought close to the ACR calculated in the user terminal 1. Thus, an abnormal state can immediately be made to disappear.

Also, since the virtual terminal 5 writes ERs into BRM cells, it is unnecessary in the DGCRA unit 4 to provide means for converting congestion information in a binary mode into congestion information in an ER mode.

Figure 9:
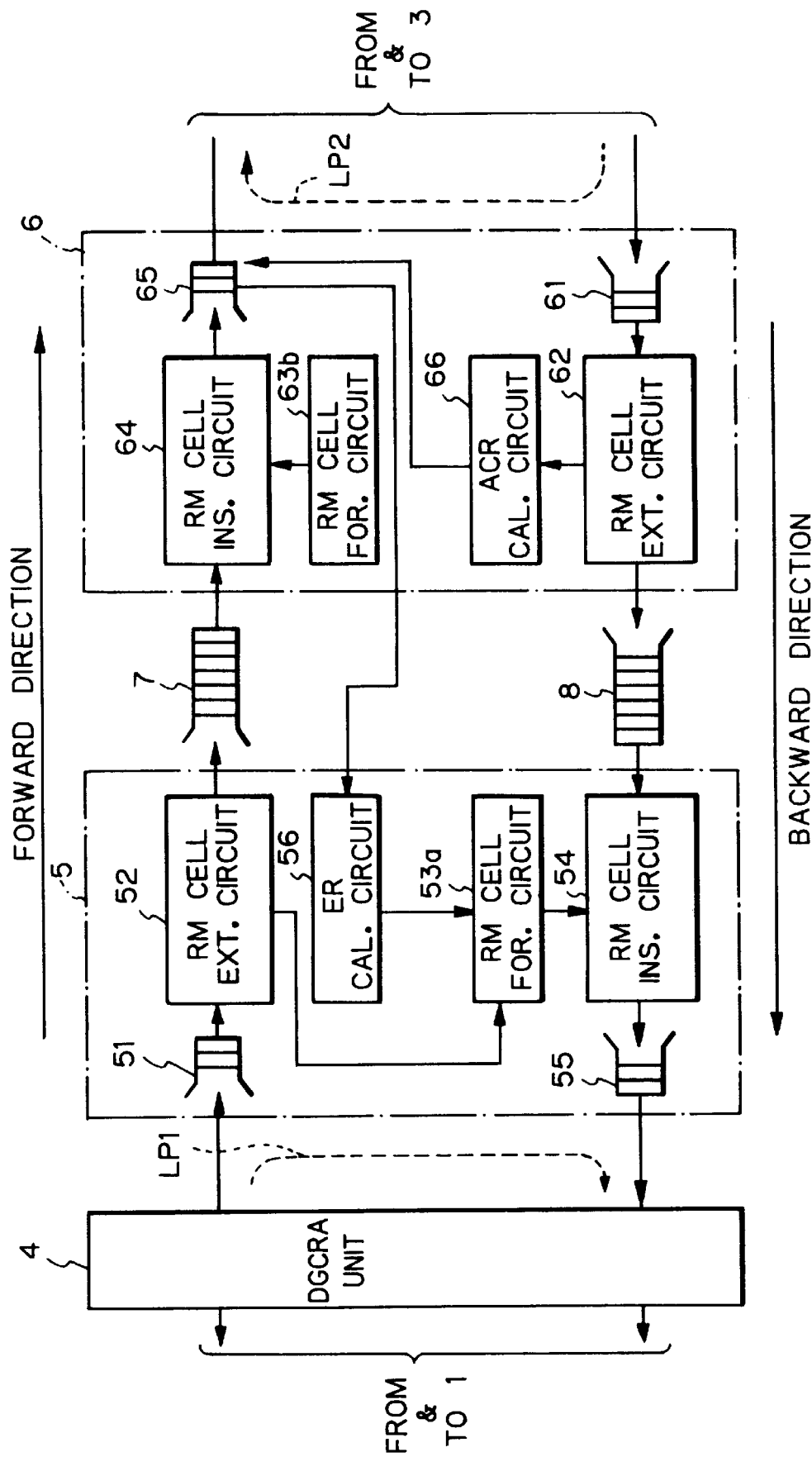
FIGS. 9 and 10 are block circuit diagrams illustrating modifications of the system of FIG. 7.

In FIG. 9, which is a modification of the system of FIG. 7, the ER calculating circuit 56 is connected to the cell buffer 65 of the virtual terminal 5, not the cell buffer 7. Therefore, the ER calculating circuit 56 calculates an ER in accordance with a cell queue in the cell buffer 65.

Figure 10:
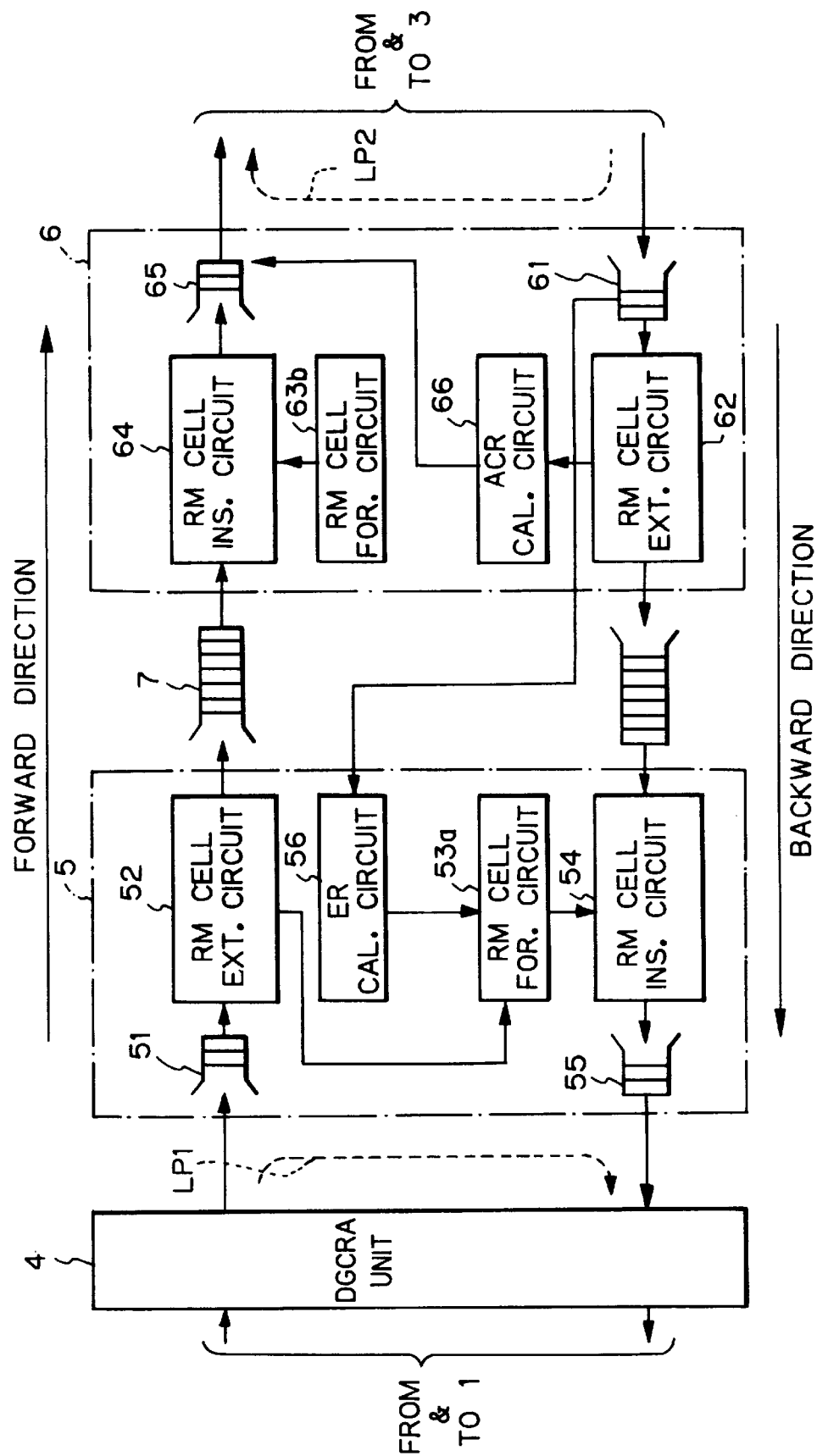

In FIG. 10, which also is a modification of the system of FIG. 7, the ER calculating circuit 56 is connected to the cell buffer 61 of the virtual terminal 5, not the cell buffer 7. Therefore, the ER calculating circuit 56 calculates an ER in accordance with in a cell queue in the cell buffer 61.

Note that the ER calculating circuit 56 can calculate an ER in accordance with two or three cell queues in the cell buffers 7, 65 and 61.

As explained hereinabove, according to the present invention, an abnormal state caused by a difference in ACR between a user terminal and a cell rate supervising unit can be rapidly changed to a normal state.

We claim:

1. A cell rate supervising system for supervising a rate of cells flowing in a direction within an asynchronous transfer mode (ATM) communication system, comprising:

a binary mode congestion feedback loop terminating unit for terminating a first congestion feedback loop on a downstream side of said direction, said first congestion feedback loop receiving a first congestion management cell from said downstream side and turning said first congestion management cell in a binary mode to said downstream side;

an explicit rate (ER) mode congestion feedback loop terminating unit, provided on an upstream side of said binary mode congestion feedback loop terminating unit, for terminating a second congestion loop on an upstream side of said direction, said second congestion feedback loop receiving a second congestion management cell from said upstream side and turning said second congestion management cell in an ER mode to said upstream side; and a dynamic generic cell rate algorithm (DGCRA) unit, provided on an upstream side of said ER mode congestion feedback loop terminating unit, for supervising the rate of cells in accordance with said second congestion management cell.

2. The system as set forth in claim 1, wherein said binary mode congestion feedback loop terminating unit comprises an allowed cell rate (ACR) calculating circuit for calculating an ACR in the ER mode in accordance with said first congestion management cell, said ER mode congestion feedback loop terminating unit receiving said ACR and writing said ACR into said second congestion management cell.

3. The system as set forth in claim 1, further comprising a cell buffer, provided between said binary mode congestion loop terminating unit and said ER mode congestion loop terminating unit, for storing the cells flowing in said direction, said ER mode congestion feedback loop terminating unit comprising:

an ER calculating circuit connected to said cell buffer for calculating an ER value in accordance with a cell queue of said cell buffer; and a cell forming circuit, connected to said ER calculating circuit, for writing said ER value into said second congestion management cell.

4. The system as set forth in claim 1, wherein said binary mode congestion feedback loop terminating unit comprises a cell buffer for transmitting the cells in said direction to said downstream side, said ER mode congestion feedback loop terminating unit comprising:

an ER calculating circuit connected to said cell buffer for calculating an ER value in accordance with a cell queue of said cell buffer; and a cell forming circuit, connected to said ER calculating circuit, for writing said ER value into said second congestion management cell.

5. The system as set forth in claim 1, wherein said binary mode congestion feedback loop terminating unit comprises a cell buffer for receiving the cells in said direction from said downstream side, said ER mode congestion feedback loop terminating unit comprising:

an ER calculating circuit connected to said cell buffer for calculating an ER value in accordance with a cell queue of said cell buffer; and a cell forming circuit, connected to said ER calculating circuit, for writing said ER value into said second congestion management cell.

6. An asynchronous transfer mode (ATM) communication system comprising:

an ATM switching unit;

a plurality of user terminals, a plurality of dynamic generic cell rate algorithm (DGCRA) units, each provided between said ATM switching unit and one of said user terminals, for supervising a rate of cells flowing from said one of said user terminals to said ATM switching unit;

a plurality of binary mode congestion feedback loop terminating units, each provided between said ATM switching unit and one of said DGCRA units, for receiving a first congestion management cell from said ATM switching unit and turning said first congestion management cell in a binary mode to said ATM switching unit; and a plurality of explicit rate (ER) mode congestion feedback loop terminating units each provided between one of said binary mode congestion feedback terminating units and one of said DGCRA units, for receiving a second congestion management cell from the one of said DGCRA units and turning said second congestion management cell in an ER mode to one of said DGCRA units.

7. The system as set forth in claim 6, wherein each of said binary mode congestion feedback loop terminating units comprises an allowed cell rate (ACR) calculating circuit for calculating an ACR in the ER mode in accordance with said first congestion management cell, each of said ER mode congestion feedback loop terminating units receiving said ACR and writing said ACR into said second congestion management cell.

8. The system as set forth in claim 6, further comprising a plurality of cell buffers, each provided between one of said binary mode congestion loop terminating units and one of said ER mode congestion loop terminating units, for storing cells flowing toward said ATM switching unit, each of said ER mode congestion feedback loop terminating units comprising:

an ER calculating circuit connected to one of said cell buffers for calculating an ER value in accordance with a cell queue of the one of said cell buffers; and a cell forming circuit, connected to said ER calculating circuit, for writing said ER value into said second congestion management cell.

9. The system as set forth in claim 6, wherein each of said binary mode congestion feedback loop terminating units comprises a cell buffer for transmitting cells flowing toward said ATM switching unit, each of said ER mode congestion feedback loop terminating units comprising:

an ER calculating circuit connected to said cell buffer for calculating an ER value in accordance with a cell queue of said cell buffer; and a cell forming circuit, connected to said ER calculating circuit, for writing said ER value into said second congestion management cell.

10. The system as set forth in claim 6, wherein each of said binary mode congestion feedback loop terminating units comprises a cell buffer for receiving cells flowing from said ATM switching unit, each of said ER mode congestion feedback loop terminating units comprising:

an ER calculating circuit connected to said cell buffer for calculating an ER value in accordance with a cell queue of said cell buffer; and a cell forming circuit, connected to said ER calculating circuit, for writing said ER value into said second congestion management cell.

\* \* \* \* \*

UNITED STATES PATENT AND TRADEMARK OFFICE
CERTIFICATE OF CORRECTION

PATENT NO. : 5,940,368
DATED : August 17, 1999
INVENTOR(S) : Toru TAKAMICHI, Satoshi KAMIYA and Tutomu MURASE It is certified that error appears in the above-identified patent and that said Letters Patent is hereby corrected as shown below:

Column 7, line 33, delete "ERM" and insert --FRM--.

Column 7, line 35, delete "ERM" and insert --FRM--.

Signed and Sealed this

Ninth Day of May, 2000

Attest:

Q. TODD DICKINSON

*Attesting Officer*     *Director of Patents and Trademarks*